United States Patent [19]

Brown, deceased et al.

[11] 4,069,840
[45] Jan. 24, 1978

[54] BALL CHECK VALVE

[76] Inventors: Cicero C. Brown, deceased, late of Houston, Tex.; by Joe R. Brown, executor, P. O. Box 19236, Houston, Tex. 77024

[21] Appl. No.: 653,939
[22] Filed: Jan. 30, 1976
[51] Int. Cl.² .......................................... F16K 15/04
[52] U.S. Cl. ........................... 137/533.11; 137/533.15; 137/519.5
[58] Field of Search ........... 137/519.5, 533.11, 533.15; 251/360, 361, 362, 363

[56] References Cited

U.S. PATENT DOCUMENTS

| 841,474 | 1/1907 | Wendelkin | 137/533.11 |
| 1,170,284 | 2/1916 | Bounty | 137/519.5 |
| 1,339,383 | 5/1920 | Beese | 137/519.5 |
| 1,700,234 | 1/1929 | McCrosky | 137/533.11 |
| 3,269,463 | 8/1966 | Page, Jr. | 137/519.5 X |
| 3,584,645 | 6/1971 | Radig | 137/519.5 |
| 3,850,191 | 11/1974 | Brown | 137/519.5 X |

FOREIGN PATENT DOCUMENTS 497,493  12/1938  United Kingdom ............ 137/533.15

Primary Examiner—William R. Cline
Attorney, Agent, or Firm—Browning, Bushman & Zamecki

[57] ABSTRACT

A check valve for permitting fluid flow in one direction and preventing flow in the reverse direction may comprise: a tubular body having a longitudinal flowbore therethrough; an annular seat within the flowbore; an inclined cylindrical pocket communicating with the flowbore; and a ball member movable between the pocket and sealing engagement with the seat in the flowbore to permit fluid to flow in one direction but blocking flow in the reverse direction.

2 Claims, 4 Drawing Figures

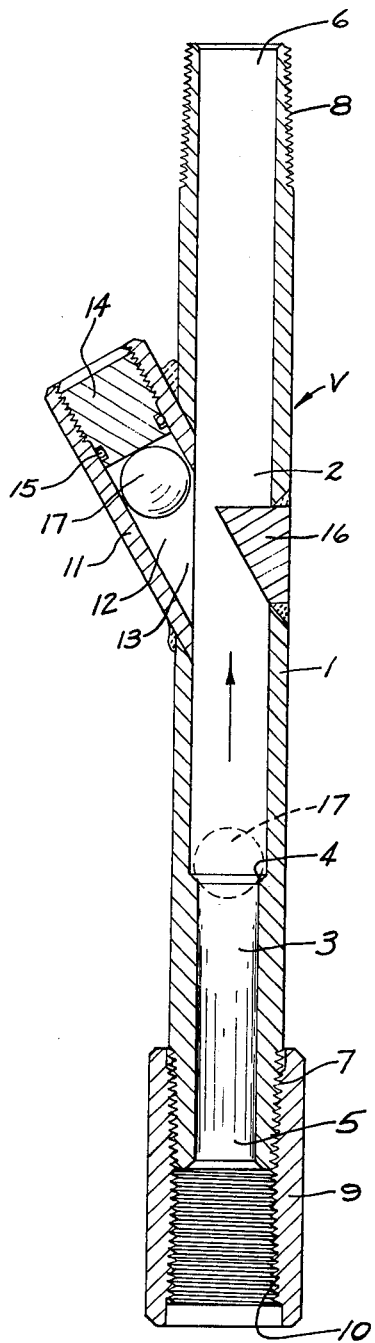
Fig. 1
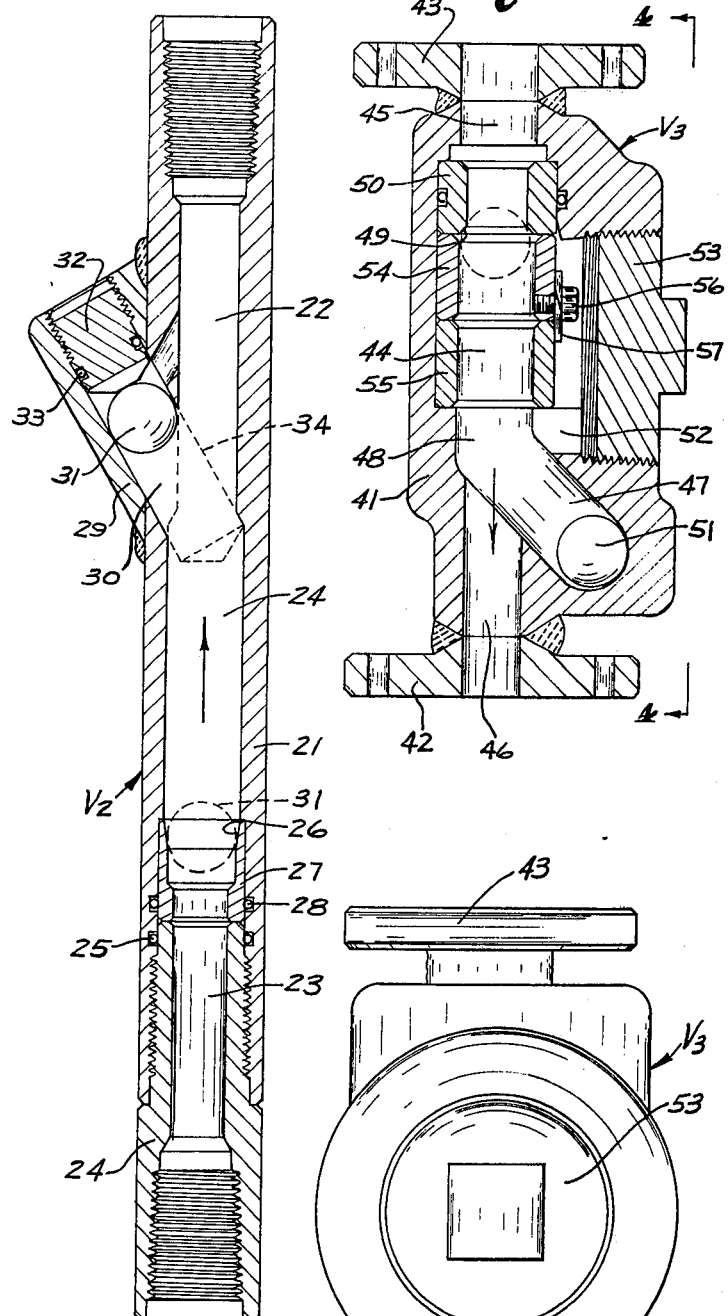
Fig. 3
Fig. 2
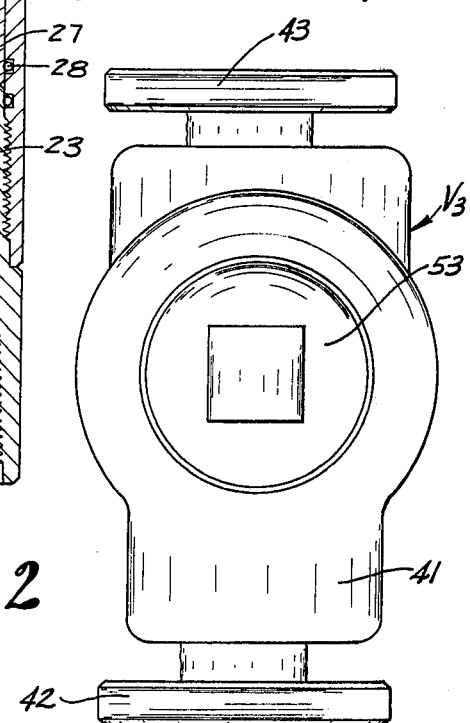
Fig. 4

BALL CHECK VALVE

BACKGROUND OF THE INVENTION

1. Field of the Invention

The present invention pertains to devices for controlling the flow of fluid. In particular, it pertains to check valves, i.e., valves permitting fluid flow in one direction but blocking flow in the reverse direction.

2. Brief Description of the Prior Art

Check valves have been in existence for many years. They are used where flow is desired in one direction but not in the opposite. For example, check valves are normally installed at the discharge of pumps and compressors, in elevated piping, and in many other applications.

The most common type of check valve is the swing check valve which employs a pivoting flapper or disc which is normally biased by its own weight or a spring to the closed position. Flow in the desired direction swings the disc away from its seat permitting fluid to flow thereby. This type of check valve is noisy, particularly in pulsating flow and at low rates of flow has inherently poor pressure drop characteristics.

There are also check valves which employ ball type closure members. However, in most of these ball check valves, the ball member is always in the path of flow, increasing pressure drop through the valve and preventing passage of tools therethrough. Thus, they are not acceptable for oil and gas wells where it is desired to pass well tools or other equipment through the pipestring. Neither are they desirable in oil and gas pipelines, since it is not possible to pass pipeline pigs through such check valves.

SUMMARY OF THE INVENTION

In the present invention, an improved check valve of the ball type is provided. The valve may comprise: a tubular body having a longitudinal flowbore therethrough; an annular seat within the flowbore; and an inclined cylindrical pocket communicating with the flowbore. A ball closure member is movable between the pocket, when fluid flows through the valve in the desired direction, and sealing engagement with the seat, when fluid is in the reverse direction, to block reverse flow therethrough.

When fluid is flowing through the valve in the desired direction, the ball is disposed in the pocket, out of the line of flow, reducing pressure drop therethrough. When the fluid tries to flow in the reverse direction, the ball moves from the pocket into sealing engagement with the seat, creating an effective and efficient seal.

In one embodiment of the invention, a deflector is provided in the flowbore to guide the ball toward the pocket. In other embodiments, a guide path is formed by the intersection of the flowbore with the cylindrical projection of the pocket, the downstream portion of the flowbore being of a diameter smaller than the ball member. With this arrangement, there is unobstructed flow through the flowbore. This is particularly desirable in well strings and pipelines where well tools, pipeline pigs, or other equipment is passed through the pipe. The valve is simple in construction, effective, low in maintenance, etc. Many other objects and advantages of the invention will be apparent from the description which follows in conjunction with the accompanying drawings.

BRIEF DESCRIPTION OF THE DRAWINGS

FIG. 1 is a half-sectional view of a ball check valve, according to a preferred embodiment of the invention;

FIG. 2 is a half-sectional view, similar to FIG. 1, depicting another embodiment of the invention in which an unobstructed flowbore is provided;

FIG. 3 is a half-sectional view of still another embodiment of the invention; and FIG. 4 is an elevation view, taken along lines 4—4 of FIG. 3, further illustrating the embodiment thereof.

DESCRIPTION OF PREFERRED EMBODIMENTS

Referring first to FIG. 1, there is shown a check valve V, according to a preferred embodiment of the invention, having a tubular body 1 with a longitudinal flowbore therethrough. The flowbore is divided into a first section 2 and a second section 3 of restricted diameter, connected by a frusto-conical annular surface 4 which forms the seat for the valve. The flowbore has an inlet 5 and an outlet 6, normal flow being in the direction of the arrow shown therein. The tubular body 1 may be threaded at 7 and 8 for connection in a pipestring, pipeline or the like. A threaded coupling 9 may be attached to provide a threaded female opening 10, if desired.

Attached to the body 1 in an inclined fashion is a tubular projection 11 which provides a cylindrical pocket 12 communicating with flowbore section 2 through an opening 13 thereinto. The axis of the pocket 12 is inclined relative to the axis of the flowbore, from its opening toward the bottom of the pocket, in a general direction corresponding to the direction of flow through the check valve V. The bottom of the pocket may be provided by a threaded plug 14 which is removable for access to the pocket. An O-ring seal 15 provides a fluidtight connection.

Projecting into the flowbore section 2 is a deflector 16, the purpose of which is to guide a ball closure member 17 between the pocket 12 and the flowbore section 2. The ball member 17 is of a diameter slightly less than flowbore section 2 and pocket 12 and may be made of metal, such as stainless steel, or other materials with good wear characteristics, i.e., certain plastics.

When flow is in the desired direction of the arrow, the ball 17 is forced into the pocket 12 allowing essentially uninterrupted flow in the desired direction. When flow stops or tries to reverse itself, gravity and reverse fluid flow forces the ball 17 out of the pocket into the flowbore 2 for sealing engagement with the seat 4, blocking and preventing reverse flow through the check valve V. Although the valve V is shown in the vertical position, it could be installed horizontally, or at any position therebetween, so long as the pocket opening 13 is at a higher elevation than seat 4 and the axis of the pocket 12 is not inclined below the horizontal.

Referring now to FIG. 2, a check valve $V_2$, according to another embodiment of the invention, is disclosed. Like in the previous embodiment, the valve $V_2$ comprises a tubular body 21 having a longitudinal flowbore therethrough. In this case, the flowbore may comprise an intermediate section 24 and outer sections 22 and 23 of restricted diameter. The outer section 23 may be carried in a threaded coupling 24 which may be removed for replacement of the valve seat. An O-ring seal 25 assures a fluidtight connection. Normal flow is in the upward direction as indicated by the arrow.

A frusto-conical seating surface 26 is provided on a seat member or bushing 27 which may be installed in or removed from the body 21 by removing the threaded coupling 24. An O-ring seal 28 is provided around the seat bushing 27.

Like in the previous embodiment, an inclined tubular projection 29 provides a cylindrical pocket 30 in which the ball closure member 31 may be disposed, during normal flow. Like in the previous embodiment, a threaded plug 32, with appropriate seal 33, may provide the bottom of the pocket. Removal of the plug 32 permits removal and replacement of ball 31.

In this embodiment, the means for guiding the ball 31 between the flowbore section 24 and pocket 30 is a transitional guide path 34 formed by the intersection of the flowbore section 24 with the cylindrical projection of the pocket 30. This may be done in manufacture by simply drilling to the depth shown through the pocket 30. One obvious advantage of such construction is a completely unobstructed flowbore through the check valve $V_2$ during normal flow. This also permits well tools, pipeline pigs or other equipment to be passed through the valve $V_2$.

Like in the previous embodiment, fluid flow in the desired direction forces the ball member 31, via guide path 34, into the side pocket 30. When flow ceases or attempts to reverse, the ball member 31 returns to the flowbore section 24, via guide path 34, for sealing engagement with the valve seat 26, as indicated by the dotted position of the ball member 31.

A third embodiment of the invention is illustrated in FIGS. 3 and 4. This type of check valve $V_3$ is particularly suited for pipeline applications. Like in the other embodiments, it is provided with a tubular body 41 at the ends of which may be welded pipeline flanges 42 and 43. This valve may be best described as if it were horizontal with flow from left to right, as illustrated by the arrow in FIG. 3.

Like in other embodiments, the valve $V_3$ is provided with a longitudinal flowbore made up of an intermediate section 44 and end sections 45 and 46. An inclined side pocket 47 communicates with the flowbore section 44, via a transition cylindrical guide path 48 formed as in the embodiment of FIG. 2.

A frusto-conical seating surface 49 is carried on a seat bushing 50. During normal flow, the ball closure member 51 resides in the pocket 47 but when flow attempts to reverse itself, the ball 51 is forced, by gravity and possibly fluid flow into engagement with the seat 49, blocking reverse flow therethrough.

This embodiment is also provided with another unique feature, a side port 52 with a threaded closure or plug 53. By removing the plug or closure 53, the seat bushing 50 and ball member 51 may be replaced. A pair of spacer bushings 54 and 55 must first be removed before the seat bushing and ball member 51 can be removed. The spacer bushings may be held in place by cap screw and washer 56 and 57, respectively.

Although three embodiments of the invention have been described herein, many others can be envisioned by those skilled in the art without departing from the spirit of the invention. Therefore, it is intended that the scope of the invention be limited only by the claims which follow.

What is claimed is:

1. A check valve for permitting fluid flow in one direction and preventing fluid flow in the reverse direction comprising:
   a. a tubular body having a longitudinal flowbore therethrough with inlet and outlet;
   b. a removable annular seat within said flowbore facing in said one direction, and removable seat retainer means for constraining said seat in said flowbore;
   c. a cylindrical pocket communicating with said flowbore through an opening, the axis of which pocket is inclined relative to the axis of said flowbore;
   d. a ball member carried by said body and movable, by fluid flow, into said pocket, when fluid flows through said valve in said one direction, to permit flow therethrough, and movable, under the influence of gravity, into sealing engagement with said seat in said flowbore, to block reverse fluid flow therethrough;
   e. deflection means within said flowbore for guiding said ball member between said pocket and said flowbore including a cylindrical guide path formed by the intersection of said flowbore with the cylindrical projection of said pocket, said flowbore downstream of said intersection being of a diameter smaller than the diameter of said ball member; and
   f. a side port in said body, and closure for said port, said side port extending from the exterior of said body to said flowbore, and permitting, upon removal of said closure, removal of said ball, seat retainer means and seat through said side port.

2. A check valve as set forth in claim 1 in which said seat is formed by a frusto-conical surface connecting two sections of said flowbore of differing diameters.

* * * * *